(12) United States Patent
Yao

(10) Patent No.: US 6,582,853 B1
(45) Date of Patent: Jun. 24, 2003

(54) ELECTRODE MATERIAL FOR NON-AQUEOUS ELECTROLYTE SECONDARY CELL AND NON-AQUEOUS ELECTROLYTE SECONDARY CELL USING THE SAME

(75) Inventor: Takeshi Yao, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,466
(22) PCT Filed: Mar. 28, 2000
(86) PCT No.: PCT/JP00/01886
§ 371 (c)(1), (2), (4) Date: Jan. 19, 2001
(87) PCT Pub. No.: WO00/60678
PCT Pub. Date: Oct. 12, 2000

(30) Foreign Application Priority Data

Mar. 30, 1999 (JP) .............................. 11-089158

(51) Int. Cl.⁷ ................................................ H01M 4/58
(52) U.S. Cl. ............................. 429/231.1; 429/231.95; 429/231.6; 429/224
(58) Field of Search ..................... 429/231.95, 231.1, 429/224, 231.6

(56) References Cited

U.S. PATENT DOCUMENTS 6,413,673 B1 * 7/2002 Kasai et al. ............ 429/231.95
2001/0003632 A1 * 6/2001 Wakihara et al. ............ 429/224

FOREIGN PATENT DOCUMENTS

| JP | 8-31421 | 2/1996 |
| JP | 9-245795 | 9/1997 |
| JP | 11-339805 | 12/1999 |

OTHER PUBLICATIONS

A. de Kock, et al., "The effect of multivalent cation dopants on lithium manganese spinel cathodes", *Journal of Power Sources*, vol. 70, No. 2, (Lausanne) Elsevier (1998) pp. 247–252.
International Search Report corresponding to application No. PCT/JP00/01886 dated Jul. 4, 2000.
English translation of Form PCT/ISA/210.

* cited by examiner

Primary Examiner—Patrick Ryan
Assistant Examiner—Angela J Martin
(74) Attorney, Agent, or Firm—RatnerPrestia

(57) ABSTRACT

An electrode material comprising a lithium-containing transition metal oxide having a spinel structure, characterized in that a part of the crystal structure of the metal oxide includes another spinel structure which is formed by the configurations of different metal elements combined which are able to form a spinel structure through a common oxygen configurations. The crystal phase of the metal oxide is stabilized by introduction of such a structure, and thus the metal oxide exhibits improved stability at a high temperature. A non-aqueous electrolyte secondary battery using the electrode material has improved storage stability at a high temperature and improved high temperature cycle characteristics, and thus keeps its capacity at a high rate even after a storage at a high temperature or after a high temperature cycle.

13 Claims, 1 Drawing Sheet

ELECTRODE MATERIAL FOR NON-AQUEOUS ELECTROLYTE SECONDARY CELL AND NON-AQUEOUS ELECTROLYTE SECONDARY CELL USING THE SAME

This Application is a U.S. National Phase Application of PCT International Application PCT/JP00/01886.

FIELD OF THE INVENTION

The present invention relates to electrode materials for non-aqueous electrolyte secondary batteries and non-aqueous electrolyte secondary batteries using the materials.

BACKGROUND OF THE INVENTION

Lithium secondary batteries (hereinafter referred to as "batteries") use, for their negative electrodes, metal lithium or elements and compounds that have electric potentials similar to that of lithium and reversibly intercalate and de-intercalate lithium ions. For the positive electrodes, compounds that reversibly intercalate and de-intercalate lithium or lithium ions and have electric potentials higher than that of lithium are used. These compounds are used as electrode material for electromotive reaction, or "active materials". As non-aqueous electrolytes such as organic or solid electrolytes are used as their electrolyte, such batteries are called non-aqueous electrolyte secondary batteries.

Featuring large electromotive force and high energy density, in recent years, the above batteries have found a wide range of applications not only in such small equipment as small electric appliances, mobile communications equipment, mobile electronic equipment, personal digital assistants, but also in small domestic power storage devices and power sources for motor bicycles, electric vehicles, hybrid cars, and the like. For these batteries, various forms such as a coin, cylinder, square, and sheet are employed according to their uses.

While batteries using metal lithium for their negative electrodes have an advantage of high energy density, dendrite deposits on the surfaces of the negative electrodes during charging. And the deposition of the dendrite is known to cause many of the following problems. For example, when dendrite penetrates a separator, an internal short circuit or shorter battery life is caused. On the surface of dendrite having a large specific surface area and high reactivity, a surface layer like a high resistance solid electrolyte is produced by the reaction of the solvent in the electrolytic solution. The layer increases the internal resistance. Moreover, the production of the layer involves an increase in the number of particles apart from electronic conduction network in the electrode plates, decreasing charge/discharge efficiency.

In order to address the above problems of a shorter battery life and lower reliability, the technologies using carbon materials of various forms or such compounds as a spinel-type lithium-containing transition metal that can intercalate and de-intercalate lithium ions without producing dendrite are developed and put into use.

Meanwhile, as the materials for positive electrodes, many kinds of lithium-containing compounds that reversibly intercalate and de-intercalate lithium ions at an electric potential higher than that of lithium are known. Among such materials, lithium cobaltate ($LiCoO_2$), lithium nickelate ($LiNiO_2$), spinel-type lithium manganate ($LiMn_2O_4$) (hereinafter referred to as "manganese spinel") exhibit an electrode potential ca 4V higher than that of lithium, and all of them can constitute batteries with high energy density.

The theoretical capacity of lithium cobaltate and lithium nickelate is 280 mAh/g, and that of manganese spinel is 148 mAh/g. The capacity of manganese spinel is smaller than that of lithium cobaltate and lithium nickelate. However, manganese spinel creates less heat stability hazards than lithium nickelate, and other materials, and manganate is an abundant and cheap natural resource. Thus, the manganese spinel is expected as a highly practical electrode material.

However, it is well known that when a battery using manganese spinel as its electrode material is stored, or repeatedly charged and discharged at high temperatures, manganese elutes from active substance and causes a phenomenon of considerably deteriorating its capacity and characteristics after high-temperature storage and cyclic charge/discharge tests.

In order to improve unstable states of the manganese spinel at high temperatures, some techniques of stabilizing the manganese spinel by substituting a part of its octahedral sites occupied by the manganese in the crystal structure of the manganese spinel with other elements have been developed.

Techniques that have been employed include:

substituting a part of the octahedral sites occupied by the manganese with transition metal elements such as cobalt and chromium; partially substituting the manganese sites for lithium that has added more than determined by its stoichiometric composition ratio, during the synthesis of active materials; and substituting a part of the manganese sites with typical elements such as aluminum and magnesium.

The aforementioned techniques called "solid state substitution" have provided slight improvement in high-temperature storage and cyclic charge/discharge characteristics. The high-temperature storage characteristic, and the like, have been improved probably because substituting a part of manganese occupying the octahedral sites with substitution elements stabilizes the crystal structure having common oxygen configurations, thus inhibiting elusion of the manganese. However, at present, the electrode materials are not yet reached to a fully practical level.

The present invention clarifies specific structural requirements for stabilizing lithium-containing transition metal oxides, and moreover, intends to improve high-temperature storage and cyclic charge/discharge characteristics of the batteries by using improved spinel compounds for their electrodes.

SUMMARY OF THE INVENTION

As a result of detailed research of the inventor of the present invention, the reason why even the aforementioned methods of substituting a part of manganese sites cannot obtain fully practical characteristics has been thought as follows:

The partially substituting elements uniformly occupy the octahedral sites of the spinel structure, and each tetrahedral site adjacent to the octahedral sites is occupied mainly by lithium. Thus, the substituting elements that should contribute to the stabilization of the crystal structure cannot exist in octahedral and tetrahedral sites, structural units of the spinel structure, at the same time.

Therefore, the present invention discloses other electrode materials and the batteries using such materials. The disclosed materials are characterized in that a lithium-containing transition metal oxide having a spinel crystal structure includes, in a part of its crystal structure, different spinel composition consisting of the configurations of different elements in combination that can constitute a spinel structure using common oxygen configurations.

In other words, the present invention intends to stabilize electrode materials by providing a stable spinel structure other than the spinel structure of the lithium-containing transition metal oxide using common oxygen configurations so that the lithium-containing metal oxide includes, in a part thereof, the stable spinel structure.

The conventional technique intended to stabilize the spinel crystal structure using its common oxygen configurations by uniformly substituting a part of manganese in the octahedral sites with substitution elements.

On the other hand, the present invention is characterized by the fact that providing at least two kinds of typical elements in a lithium-containing transition metal oxide at the same time in a ratio that can form a spinel structure allows the formation of a spinel structure of the foregoing typical elements in the lithium-containing transition metal oxide using the oxygen configurations common to them. The present invention allows a lithium-containing transition metal oxide to be stabilized by providing a stable spinel structure portion in the lithium-containing transition metal oxide.

The composition of the lithium-containing transition metal oxides used in the present invention has no limitation except that they have spinel structures. For example, the effect of stability can be expected to $LiMn_2O_4$ having a molar ratio of Li:Mn=1:2, $Li_{1.2}Mn_{1.8}O_4$ having a molar ratio of Li:Mn=1.2:1.8, and $LiMn_{1.6}Ni_{0.4}O_4$ having a molar ratio of Li:Mn:Ni=1:1.6:0.4.

The spinel compounds of the present invention can be synthesized at the step of synthesizing spinel materials by adding, to a material of a lithium-containing transition metal oxide, a plurality of materials containing typical elements for forming spinel structures in combination at predetermined mixing ratios, and firing the obtained mixtures.

DETAILED DESCRIPTION OF THE PREFERRED EMBODIMENTS

Figure 1:
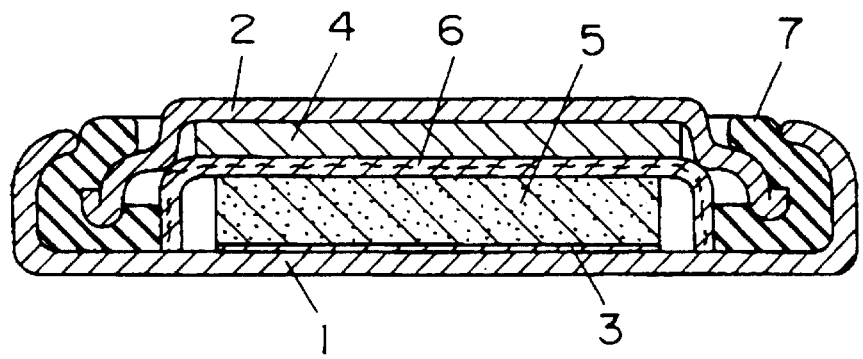
FIG. 1 is a schematic cross section of a coin-type lithium secondary battery in accordance with an exemplary embodiment of the present invention.

The preferred embodiments of the present invention are described below in detail.

The electrode materials for batteries of the present invention (hereinafter referred to as "electrode materials") are characterized in that a lithium-containing transition metal oxide having a spinel crystal structure includes, in a part thereof, different spinel composition consisting of the configurations of different elements in combination that can constitute a spinel structure using common oxygen configurations.

In addition, the electrode materials are characterized in that the different elements in combination forming different spinel composition using the above common oxygen configurations are combination of two or more elements selected from the typical elements belonging to Groups 2, 13, 14 and 15 defined by IUPAC.

When the lithium-containing spinel metal oxide is a manganese spinel and the different elements in combination are composed of manganese and aluminum in a molar ratio of Mg:Al=1:2, especially excellent property can be obtained.

The combinations of different elements in electrode materials are composed of two, three, or more kinds of elements selected from the typical elements belonging to Groups 2, 13, 14, and 15. The configurations of these elements form a structural unit of the spinel structure.

The battery in accordance with the present invention uses the electrode materials of the aforementioned embodiments.

In the aforementioned embodiments of the present invention, the spinel structure of the electrode material may be any type belonging to cubic, tetragonal, hexagonal, trigonal, orthorhombic, monoclinic, and triclinic systems. Especially, those belonging to the cubic and tetragonal systems are preferred.

The combinations of different elements include magnesium and aluminum in a molar ratio of Mg:Al=1:2, magnesium and gallium in a molar ratio of Mg:Ga=1:2, magnesium and indium in a molar ratio of Mg:In=1:2, calcium and indium in a molar ratio of Ca:In=1:2, barium and indium in a molar ratio of Ba:In=1:2, strontium and indium in a molar ratio of Sr:In=1:2, magnesium and tin in a molar ratio of Mg:Sn=2:1, magnesium, aluminum, and gallium in a molar ratio of Mg:Al:Ga=1:1:1, and magnesium, aluminum, and gallium in a molar ratio of Mg:Al:Ga=1:1.2:0.8. Other than shown above, any element can be used in combination at any ratio on condition that the elements can constitute a spinel structure using common oxygen configurations. As for the combinations of the different elements used, not only one but also two or more combinations can be used at the same time. Many of the typical elements can maintain stable bonds without changing the valence when lithium is inserted or released.

Among the above combinations of the elements, magnesium and aluminum in a molar ratio of Mg:Al=1:2 exhibit excellent high-temperature storage and capacity maintenance characteristics when used as an electrode material.

$MgAl_2O_4$, which is widely known as a compound being the origin of the name "spinel compound", is an extremely chemically stable material. There are many spinel type oxides that are chemically stable like $MgAl_2O_4$. Especially, spinel type oxides composed of typical elements are stable.

When an oxide having a spinel structure is expressed by $AB_2O_4$, in a case, A is an element to be a bivalent cation and B is an element to be a trivalent cation, and in another case, A is an element to be a tetravalent cation and B is an element to be a bivalent cation. In these cases, there are three forms of cation distribution as described below. In the followings, those in the parentheses ( ) show cations occupying the tetrahedral sites and those in the brackets [ ] cation occupying the octahedral sites.

The first distribution form is the normal spinel type expressed by $(A)[B_2]O_4$ in which A ions are in the tetrahedral sites and B ions in the octahedral sites.

The second distribution form is the inverse spinel type expressed by $(B)[AB]O_4$ in which a half number of B ions are in the tetrahedral sites and A ions and the remaining half number of B ions are randomly placed in the octahedral sites.

The third distribution form is a intermediate configuration between the normal and inverse spinel configurations that is expressed by $(A_\xi \cdot B_{1-\xi})[A_{1-\xi} \cdot B_{1+\xi}]O_4$, where $0<\xi<1$.

In addition, there are some structures that cannot be expressed by the above $AB_2O_4$, such as $MgAlGaO_4$.

In the present invention, any type that can form a stable spinel structure can be used among normal, inverse, intermediate and other spinel structures.

Preferred embodiments of the present invention are described with reference to the following examples. However, the present invention is not limited to these examples. First, synthesis of the electrode materials is described.

In these examples, described are the cases where main elements constituting the spinel structure are lithium and manganese, which is a transition metal, and the different elements in combination constituting different spinel composition in the manganese spinel using common oxygen configurations are manganese from Group 2 elements and aluminum from Group 13 elements in a molar ratio of Mg:Al=1:2.

The synthesis of the electrode material was performed in the following manner. Lithium carbonate and electrolytic manganese dioxide were used as raw materials of lithium and manganese, respectively. Basic magnesium carbonate and aluminum hydroxide were used as raw materials of magnesium and aluminum, respectively.

First, lithium carbonate and electrolytic manganese dioxide were weighed in a molar ratio Li:Mn=1:2. Next, basic magnesium carbonate and aluminum hydroxide were mixed in the following mixing ratios using an automatic mortar for five hours until mixed powders were prepared.

EXAMPLES 1 and 4

Basic magnesium carbonate was mixed in a molar ratio of Li:Mg=0.95:0.05. Aluminum hydroxide was also mixed in a molar ratio of Mn:Al=0.95:0.05.

EXAMPLES 2 and 5

Basic magnesium carbonate was mixed in a molar ratio of Li:Mg=0.90:0.10. Aluminum hydroxide was also mixed in a molar ratio of Mn:Al=0.90:0.10.

EXAMPLES 3 and 6

Basic magnesium carbonate was mixed in a molar ratio of Li:Mg=0.80:0.20. Aluminum hydroxide was also mixed so in a mole ratio of Mg:Al=0.80:0.20.

In addition, in order to clarify the aforementioned effects of the present invention, samples with no basic magnesium carbonate or aluminum hydroxide added and samples with either one of them added were prepared for comparison. All the conditions other than the composition were the same as those of the examples of the present invention.

Comparative Examples 1 and 4

Used were the mixed powder of lithium carbonate and electrolytic manganese dioxide in a molar ratio of Li:Mn=1:2.

Comparative Example 2

Lithium carbonate, electrolytic manganese dioxide, and basic magnesium carbonate were mixed in a mole ratio of Li:Mn:Mg=0.95:2:0.05.

Comparative Example 3

Lithium carbonate, electrolytic manganese dioxide, and aluminum hydroxide were mixed in a mole ratio of Li:Mn:Al=1:1.9.0.1.

The forgoing mixed powders were formed into pellets, the pellets were fired for 48 hours at a temperature of 850° C. in the air, and then the fired bodies were pulverized into samples for electrode materials.

With Examples 1 through 3 and Comparative Examples 1 through 3, the above pulverized materials were directly used as the samples for electrode materials.

With Examples 4 through 6, the above pulverized materials were kept at a temperature of 450° C. for one week and then used as the samples for electrode materials.

Each positive electrode mixture was prepared by mixing 80 parts by weight of one of the samples obtained as above, 15 parts by weight of carbon black as a conductive material, and 5 parts by weight of poly-tetrafluoroethylene as a binder. These mixtures were formed and used as positive electrodes.

Next, batteries were constructed using the electrodes obtained as above for their positive electrodes. FIG. 1 shows a schematic cross section of a battery in accordance with the present invention. The battery of the present invention consist of positive electrode case 1, sealing plate 2, current collector 3, negative electrode 4, positive electrode 5, separator 6, and gasket 7.

Inside of positive electrode case 1, current collector 3 of stainless steel is spot-welded. On the upper face of current collector 3, a positive electrode made of the positive electrode mixture is crimped. Placed at an upper part of positive electrode case 1 is sealing plate 2 of stainless steel that has an inner face bonded with negative electrode 4 of metal lithium. Sealing plate 2 also serves as a negative terminal. Micro-porous separator 6 of polypropylene is impregnated with non-aqueous electrolytic solution containing 1 mole/L of lithium phosphate hexafluoride dissolved in a mixed solvent comprising the same volume of ethylene carbonate and 1,3-dimethoxyethane. Separator 6 is placed between the positive and negative electrodes. Polypropylene gasket 7 is placed and crimped between the opening end of the positive electrode case 1 and sealing plate 2, sealing the opening. The dimensions of the battery designed in accordance with these embodiments are 20 mm in diameter and 1.6 mm in total height.

Next, evaluation on the characteristics of the batteries using the electrode materials of the present invention is described. Charge/discharge tests were performed on the batteries constructed as above under a current density of 0.5 mA/cm$^2$, at voltages ranging from 4.3 to 3.0 V, and at a temperature of 20° C. to measure their initial capacities.

Next, stability of the electrode materials and batteries at high temperatures were evaluated by high-temperature storage test and cyclic charge/discharge tests. After the aforementioned initial capacity measurement, the batteries were charged at a temperature of 20° C. and a voltage of 4.3 V, stored for three days at a high temperature of 80° C., and then their discharge capacities at 20° C. after storage were measured. With the discharge capacities before storage set to 100, the capacity retention rates after the high-temperature storage were evaluated as a high-temperature storage characteristic.

In order to evaluate the stability after high-temperature charge/discharge cycles, charge/discharge operations were repeated twenty times at a temperature of 60° C. under the same conditions as the aforementioned initial capacity test. Then the discharge capacities at a temperature of 20° C. were measured after the cycle test, and the discharge capacities before and after the test were compared. With the discharge capacities before the cyclic charge/discharge test set to 100, the capacity retention rates after the test were evaluated as a high-temperature cyclic charge/discharge characteristic. These high-temperature characteristics are summarized in Table 1.

TABLE 1

| Item | Initial discharge capacity mAh/g | Capacity retention rate after high-temperature storage % | Capacity retention rate after high-temperature cycle test % |
| --- | --- | --- | --- |
| Example 1 | 118 | 88 | 91 |
| Example 2 | 115 | 91 | 91 |
| Example 3 | 111 | 93 | 93 |
| Example 4 | 119 | 89 | 92 |
| Example 5 | 115 | 92 | 92 |
| Example 6 | 112 | 94 | 94 |
| Comparative Example 1 | 124 | 82 | 83 |
| Comparative Example 2 | 119 | 80 | 85 |
| Comparative Example 3 | 120 | 82 | 84 |
| Comparative Example 4 | 124 | 83 | 84 |

As for the capacity retention rate after high-temperature storage, while the battery without additional elements shown in Comparative Example 1 exhibited 82%, Comparative Examples 2 and 3 exhibited 80% and 82%, respectively, as shown in Table 1. As for the capacity retention rates after high-temperature charge/discharge cycles, while the battery of Comparative Example 1 exhibited 83%, those of Comparative Examples 2 and 3 exhibited 85% and 84%, respectively. In other words, no special improvement in high-temperature storage and cyclic charge/discharge characteristics was found with electrode materials with either of magnesium or aluminum added independently. With the battery of Comparative Example 4, the capacity retention rate after high-temperature storage was 83% and the capacity retention rate after high-temperature cycles was 84%.

In contrast, the capacity retention rates after high-temperature discharge shown in Examples 1 through 6 in accordance with the present invention were 88%, 91%, 93%, 89%, 92%, and 94%, respectively. The capacity retention rates after high-temperature cycles of Examples 1 through 6 were 91%, 91%, 93%, 92%, 92%, and 94%, respectively. These results show that the addition of magnesium and aluminum in a molar ratio of Mg:Al=1:2 has considerably improved the high-temperature characteristics.

In addition, Table 1 shows the effect of the present invention is enhanced when the electrode materials once synthesized at a high-temperature is annealed at a temperature lower than the synthesizing temperature. As shown in Table 1, an increase of 1% in the area above 90% means a considerable effect.

The annealing has caused the improvement probably because it has increased the probability that magnesium and aluminum associate at an atomic level. In other words, annealing the electrode material at a temperature lower than its synthesizing temperature after having exposed to high temperatures without completing the synthesis decreases the effect of entropy in a free energy. As a result, the entire system is considered to change in a direction in which disorder moves to order.

Thus, it is considered that annealing has increased the number of configurations of $MgAl_2O_4$ at the atomic level and made the spinel structures more stable, even though the solid solution state has not changed in a macroscopic manner.

Figure 2:
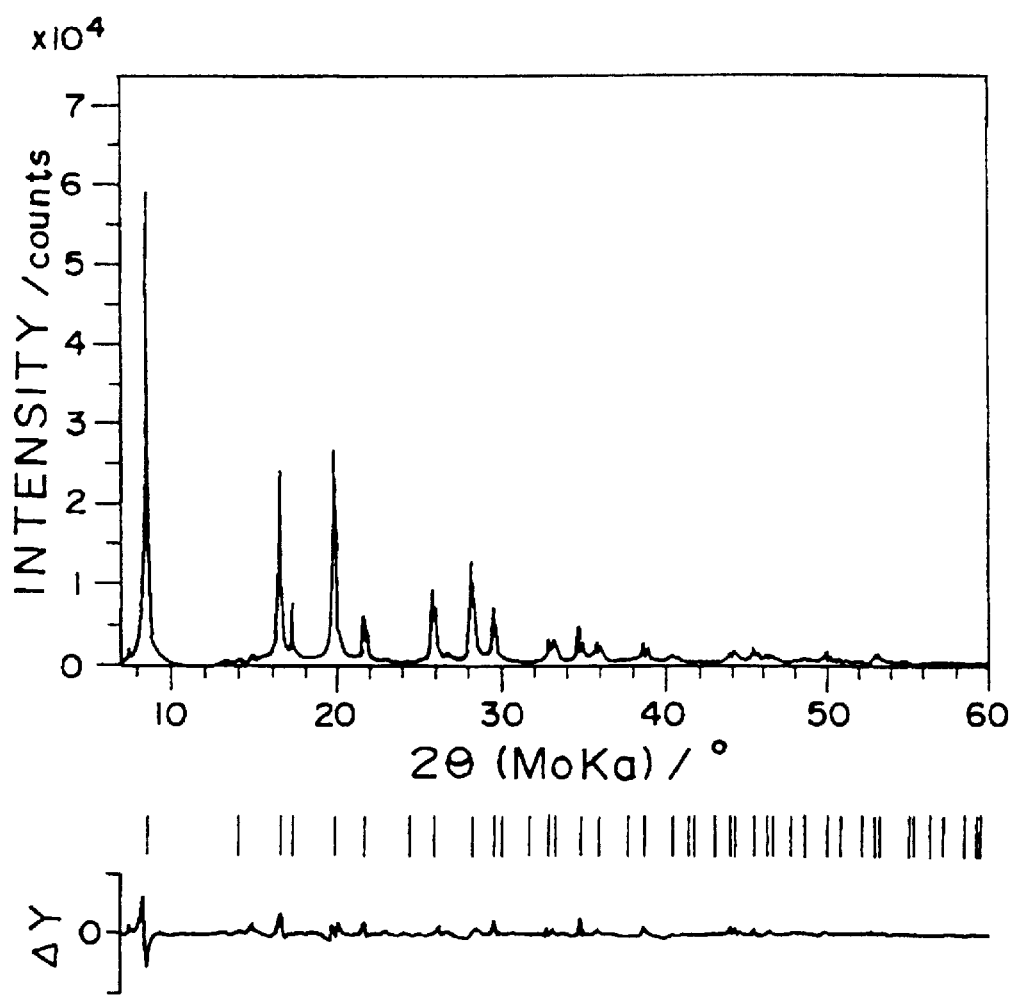
FIG. 2 shows an X-ray diffraction pattern and an analysis result of the Rietveld method of an electrode material in accordance with the present invention.

Meanwhile, besides the aforementioned battery tests, the state of the crystals were analyzed using X-ray powder diffraction patterns and their Rietveld analysis. FIG. 2 shows an X-ray powder diffraction pattern and an result of the analysis of a sample synthesized in accordance with the present invention using the Rietveld method. These results show no impurity phase was found in the synthesized samples of the present invention and confirmed that all the samples were synthesized as uniform spinel structures.

In other words, the result that the batteries using the synthesized samples of Comparative Examples 2 and 3 did not exhibit any considerable improvement in their high-temperature characteristics than those using the synthesized samples of Comparative Example 1 shows that incorporating either magnesium or aluminum independently in the original manganese spinel structure does not improve the stability at high temperatures.

In contrast, the fact that all the samples of the present Examples exhibited higher capacity retention rates after the high-temperature storage and cyclic charge/discharge test than Comparative Example 1 shows that the high-temperature stability of manganese spinel compounds has been improved and the high-temperature storage and cyclic charge/discharge characteristics of the batteries using aforementioned compounds as their electrode materials have considerably been improved.

The manganese spinel of the present invention exhibited excellent characteristics probably because different spinel composition, $MgAl_2O_4$, is formed with common oxygen configurations by addition of magnesium from Group 2 elements and aluminum from Group 13 elements, and the different spinel composition is included in a part of the crystal structure of the manganese spinel.

The above spinel crystals are essentially formed in the process of firing the mixtures. The effects are considerably influenced by such conditions as mixing state of the raw materials, and firing temperature, time, and ambient atmosphere; however, they are not essentially influenced by mixing procedures, mixing means and firing equipment, and the like.

There is an appropriate addition amount of the additives for the above improvement in the high-temperature stability of the spinel compounds. In the present Examples, it is substantially effective when magnesium and aluminum contents are between 0.1 to 50 mol % of lithium. When the contents are below 0.1%, the effect of stabilizing the original spinel structure becomes less. When the contents are above 50 mol %, the initial discharge capacities tend to decrease, which impairs the attractive advantage as electrode materials. The range of the amount to be added is the same for other typical elements selected from Groups 2, 13, 14, and 15.

On the other hand, the effect of the stability at high temperatures are essentially based on the property of the crystals of spinel compounds; therefore, the same effectiveness can be obtained with any combination of a conductive material, binder, current collector, separator, non-aqueous electrolytic solution, and battery structure other than described in the above examples.

First, positive electrode is described. Carbon black is used as a conductive material for the positive electrodes of the examples. However, conductive materials for the positive electrodes can be any electronic conductive material on condition that it does not chemically change within the range of charge and discharge electric potentials of the positive electrode. Examples of such materials include graphite materials including natural graphite (scale-shape graphite) and artificial graphite; carbon blacks such as acetylene black, Ketzen black, channel black, furnace black, lamp black and thermal black; conductive fibers such as carbon fibers and metallic fibers; fluorinated carbon; metal powders such as aluminum; conductive whiskers such as a zinc oxide and potassium titanate, conductive metal oxides such as a titanium oxide; and organic conductive materials such as polyphenylene derivatives. These materials can be used independently or in combination. Among these conductive materials, artificial graphite and acetylene black are especially preferable. The amount of conductive materials to be added is not specifically defined; however, 1 to 50 wt %, especially 1 to 30 wt %, of the positive electrode material is preferable. For carbons and graphite, 2 to 15 wt % is most preferable.

For binders for the positive electrodes of the examples, polyfluoroethylene is used. Both thermoplastic resin and thermosetting resin can be used. Preferable binders for the present invention include the following materials; polyethylene (PE), polypropylene (PP), polytetrafluoroethylene (PTFE), polyvinylidene fluoride (PVDF), styrene-butadiene rubber (SBR), a tetrafluoroethylene-hexafluoroethylene copolymer, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, a ethylene-tetrafluoroethylene copolymer (ETFE resin), poly chlorotrifluoroethylene (PCTFE), a vinylidene fluoride-hexafluoropropylene copolymer, a propylene-tetrafluoroethylene copolymer, a ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, an ethylene-methyl acrylate copolymer or its Na+ ion crosslinking body, and an ethylene-methyl methacrylate copolymer or its Na+ ion crosslinking body. These materials can be used independently or in combination. Preferable materials among these materials are polyvinylidene fluoride (PVDF) and polytetrafluoroethylene (PTFE).

For current collectors for the positive electrodes of the examples, stainless steel nets are used. Any electronic conductive material can be used on condition that it does not chemically change within the range of charge and discharge electric potentials of the positive electrode used.

Examples of such materials include stainless steel, aluminum, titanium, carbon, and conductive resin, as well as aluminum or stainless steel coated with carbon or titanium. Among these, aluminum and aluminum alloys are preferable materials. Metals can also be used after their surfaces have been oxidized. Desirably, the current collector is surface-treated to have projections and depressions on its surface. The shapes of the current collector include a film, sheet, net, punched sheet, lath, porous body, foam, fibers, and formed non-woven fabric as well as a foil. The thickness is not specifically defined; however, collectors 1 to 500 $\mu$m thick are used.

As additives for the electrode mixtures of the examples, various additives, such as a filler, dispersant, ionic conductor, and pressure intensifier, can be used other than the conductive materials and binders. As the filler, any fibrous material that does not chemically change in the constructed battery can be used. Preferable materials include olefinic polymers such as polypropylene and polyethylene and fibers such as glass fibers and carbon fibers. The amount of the filler to be added is not specifically defined; however, 0 to 30 wt % of the electrode mixture is preferable.

Preferably, the positive and negative electrodes are structured so that at least the positive electrode is opposing the negative electrode. These opposite electrodes can be made in any form according to their requirements. Such forms include a plate, sheet, and wound belts as well as a disk as shown in these embodiments.

Next, negative electrode is described. In order to clarify the effect of the present invention on the high-temperature stability of the spinel compounds, lithium metal instead of spinel compound is used for the negative electrodes of the examples. In reality, some spinel compounds, such as titan spinel derivatives, applicable to the negative electrodes exist. Different spinel composition can be incorporated in the structures of these spinel compounds for the negative electrodes, using common oxygen configurations. A titan spinel system, for example, causes no problem of titanium elution; however, improving the crystal structure of the spinel compound according to the present invention is effective in improving the electrochemical reversibility and cyclic charge/discharge characteristics.

When the spinel compounds of the present invention are used for the negative electrode, a conductive material, binder, and additives are added as required to prepare a mixture like the positive electrode. However, when the material itself has electronic conductivity, the conductive material can be omitted.

As conductive materials for the negative electrodes, the same electronically conductive materials used for the positive electrodes can be used. Examples of such materials include graphite materials including natural graphite (scale-shape graphite) artificial graphite, and expanded graphite; carbon blacks such as acetylene black, Ketzen black, channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, artificial graphite, acetylene black, and carbon fibers are especially preferable. The amount of conductive materials to be added is not specifically defined; however, 1 to 50 wt % of the positive electrode material is preferable, and 1 to 30 wt % is most appropriate. The negative electrode material in accordance with the present invention has conductivity in itself; thus the battery can work without any additional conductive material.

For binders for the negative electrodes, all the aforementioned materials for the positive electrodes can be used. Among these, preferable materials are styrene-butadiene rubber, polyvinylidene fluoride, an ethylene-acrylic acid copolymer or its Na+ ion crosslinking body, an ethylene-methacrylic acid copolymer or its Na+ ion crosslinking body, an ethylene-methyl acrylate copolymer or its Na+ ion crosslinking body, and an ethylene-methyl methacrylate copolymer or its Na+ ion crosslinking body.

Any electronic conductor that does not chemically change in the constructed battery can be used for a current collector for the negative electrode. Preferable materials include stainless steel, nickel, copper, titanium, carbon, and conductive resin. Copper and stainless steel surface nickel surface treated with carbon, nickel or titanium can also be used. Especially, copper and copper alloys are preferable materials for the negative electrode. These materials can also be used after their surfaces have been oxidized. A structure of the current collector that is surface-treated to have projections and depressions on its surface is a further preferable.

The shapes of the current collector include a film, sheet, net, punched sheet, lath, porous body, foam, and formed fibers as well as a foil. The thickness is not specifically defined; however, collectors 1 to 500 μm thick are used.

Next, effective non-aqueous electrolytic solutions are described. Beside the non-aqueous electrolytic solution containing lithium phosphate hexafluoride dissolved in a mixed solvent comprising ethylene carbonate and 1,3-dimethoxy ethane shown in the examples, other various non-aqueous electrolytic solutions containing lithium salts dissolved in the solvent can be used.

Examples of such non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; γ-lactones such as γ-butyrolactone; acyclic ethers such as 1,2-dimethoxy ethane (DME), 1,2-diethoxy ethane (DEE), and ethoxy methoxy ethane (EME); cyclic ethers such as tetrahydrofuran and 2-methyl tetrahydrofuran; and non-protonic organic solvents such as dimethyl sulfoxide, 1,3-dioxolane, formamide, acetamide, dimethylformamide, dioxolane, acetonitrile, propylnitrile, nitromethane, ethyl monoglime, triester of phosphoric acid, trimethoxy methane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane saltane, anisole, dimethyl sulfoxide and N-methylpyrolidon. These solvents are used independently or as a mixture of two or more solvents. Mixtures of cyclic carbonate and acyclic carbonate, or cyclic carbonate, acyclic carbonate and aliphatic carboxylate are especially preferable.

Lithium salts dissolved into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salt of lower aliphatic carboxylic acid, LiCl, LiBr, LiI, chloroboron lithium, 4-phenyl boric acid, and an imide group. These lithium salts can be used individually or as a mixture of two or more lithium salts. It is especially preferable to include $LiPF_6$ in the electrolytic solution. Especially preferable non-aqueous electrolytic solutions of the present invention include an organic solvent containing at least EC and EMC, and as a supporting salt, $LiPF_6$.

The amount of the electrolytic solution to be added to the battery is not specifically defined. Considering the amount of the positive and negative electrode materials and the size of the battery, the required amount is used. The amount of the supporting electrolytes against the non-aqueous solvents is not specifically defined, however, 0.2 to 2 mol/l is preferable, and especially 0.5 to 1.5 mol/l is most appropriate.

The excellent stability and reliability the batteries of the present invention exhibit at high temperatures are provided by the crystal structures of the spinel compounds in accordance with the present invention. Therefore, the similar improvement in the high-temperature characteristics can be attained with any form of electrolyte, e.g. a non-aqueous electrolytic solution, polymer electrolyte containing electrolytic solution solidified or immobilized by polymer material, and solid electrolyte.

Solid electrolytes include inorganic and organic ones. As the inorganic solid electrolytes, well-known compounds such as lithium nitrides, lithium halides, and lithium oxides can be used. Among them, $Li_4SiO_4$, $Li_4SiO_4$—LiI—LiOH, $xLi_3PO_4$—$(1-x)Li_4SiO_4$, $Li_2SiS_3$, $Li_3PO_4$—$Li_2S$—$SiS_2$ and phosphorus sulfide compounds can be used.

As the organic solid electrolytes, so-called polymer electrolytes can be used. The polymer electrolytes are polymer materials such as polyethylene oxides, polypropylene oxides, polyphosphazene, polyaziridine, polyethylene sulfides, polyvinyl alcohol, polyvinylidene fluorides, polyhexafluoropropylene and their derivatives, mixtures and complexes that contain lithium salts in the form of solid or electrolytic solution containing the salts dissolved in a non-aqueous solvent.

Moreover, it is effective to add other compounds to the electrolytic solution in order to improve the charge/discharge characteristics. Such compounds include triethyl phosphite, triethanolamine, cyclic ethers, ethylene diamine, n-glime, pyridine, triamide hexaphosphate, nitrobenzene derivatives, crown ethers, quaternary ammonium salts, and ethylene glycol dialkyl ether.

In the examples, a separator is used between the positive and negative electrodes because the electrolyte is liquid. As this separator, an insulating micro-porous thin film having a large ion permeability and a predetermined mechanical strength can widely be used other than a micro-porous polypropylene film. Desirably, these separators have functions of closing their pores and increasing the resistance to ion conduction above predetermined temperatures. In terms of the closing function at high temperatures, and moreover, resistance to organic solvents and hydrophobic properties, olefinic polymers such as polypropylene and polyethylene are preferable materials.

Sheets and woven or non-woven fabrics made of glass fibers, and the like, can also be used. These materials are used independently or in combination with a film of other materials as required.

Desirably, the micro-porous separator has pores of a diameter that does not allow the positive or negative electrode materials, binder, conductive material liberated from the electrode sheets to pass. For example, pores 0.01 to 1 μm in diameter are preferable. Generally, separators 10 to 300 μm thick are used. The porosity of the separator is determined according to the permeability of electrons and ions, materials, and film pressure. Generally, a porosity between 30 to 80% is desirable.

Another form of the separator can be used to construct a battery with integrated negative and positive electrodes and separator. The positive or negative electrode mixture contains a polymer electrolyte having a polymer material absorbing an organic electrolytic solution containing a lithium salt dissolved in an organic solvent. A polymer containing the above electrolytic solution is also absorbed in the porous separator.

In this case, any polymer material that can absorb and hold the organic electrolytic solution can be used. Especially, a vinylidene fluoride-hexafluoropropylene copolymer is preferable. The polymer electrolyte may be placed between the positive and negative electrodes as a separator layer even without the use of a micro-porous separator.

Basically, the aforementioned high-temperature stability can be provided by the state of crystals of the spinel compounds in accordance with the present invention. Therefore, it is not limited by any structural condition or application. Furthermore, the spinel compounds of the present invention can be used in combination with other compounds for electrode materials as required. In that case, effects according to mixing ratios can be obtained.

Besides the coin type shown in the examples, the shapes of the batteries include a button, sheet, laminates, cylinder, flat, square, and a special shape such as a large cylinder used for an electric vehicle, and the like.

INDUSTRIAL APPLICABILITY

As described above, the electrode material of the present invention is a spinel-type lithium-containing transition metal oxide. This metal oxide includes, in a part of its crystal structure, different spinel composition consisting of configurations of different elements in combination that can form a spinel structure using common oxygen configurations. This electrode material has improved high-temperature stability and can considerably improve the high-temperature storage and cyclic charge/discharge characteristics of the battery using the material.

The battery of the present invention can be used for personal digital assistants, mobile electronic equipment, small domestic power storage devices, motor bicycles, and hybrid cars. However, its applications are not limited to these.

What is claimed is:

1. An electrode material for a non-aqueous electrolytic secondary battery comprising a lithium-containing transition metal oxide having a first spinel crystal structure and a second spinel crystal structure.

2. The electrode material for the non-aqueous electrolytic secondary battery of claim 1 wherein said second spinel crystal structure comprises at least two elements selected from the group consisting of Groups 2, 13, 14, and 15 defined by IUPAC.

3. The electrode material for the non-aqueous electrolytic secondary battery of claim 2 wherein:

at least one element selected from said Group 2 mainly occupies tetrahedral sites;

at least one element selected from said Groups 13, 14, and 15 mainly occupies octahedral sites; and the configurations of these elements form a spinel crystal structure.

4. The electrode material for the non-aqueous electrolytic secondary battery of claim 2 wherein said elements in combination are magnesium and aluminum in a molar ratio of Mg:Al=1:2.

5. The electrode material for the non-aqueous electrolytic secondary battery of claim 4 wherein said lithium-containing transition metal oxide is a manganese spine.

6. A non-aqueous electrolytic secondary battery comprising a positive electrode and a negative electrode, wherein:

at least one of said positive electrode and said negative electrode comprises a lithium-containing transition metal oxide having a first spinel crystal structure and a second spinel structure sharing oxygen with said first spinel structure.

7. The non-aqueous electrolytic secondary battery of claim 6 wherein said second spinel crystal structure comprises at least two elements selected from the group consisting of Groups 2, 13, 14, and 15 defined by IUPAC.

8. The non-aqueous electrolytic secondary battery of claim 7 wherein:

at least one element selected from said Group 2 mainly occupies tetrahedral sites; and at least one element selected from said Groups 13, 14 and 15 mainly occupies octahedral sites.

9. The non-aqueous electrolytic secondary battery of claim 7 wherein said elements in combination are magnesium and aluminum in a molar ratio of Mg:Al=1:2.

10. The non-aqueous electrolytic secondary battery of claim 9 wherein said lithium-containing transition metal oxide is a manganese spinel.

11. The electrode material for the non-aqueous secondary battery of claim 2 wherein said elements in combination are selected from the group consisting of magnesium and aluminum in a molar ratio of Mg:Al=1:2; magnesium and gallium in a molar ratio of Mg:Ga=1:2; magnesium and indium in a molar ratio of Mg:In=1:2; calcium and indium in a molar ratio of Ca:In=1:2; barium and indium in a molar ratio of Ba:In=1:2; strontium and indium in a molar ratio of Sr:In=1:2; magnesium and tin in a molar ratio of Mg:Sn=2:1; magnesium, aluminum, and gallium in a molar ratio of Mg:Al:Ga=1:1:1; and magnesium, aluminum, and gallium in a molar ratio of Mg:Al:Ga=1:1.2:0.8.

12. The non-aqueous secondary battery of claim 7 wherein said elements in combination are selected from the group consisting of magnesium and aluminum in a molar ratio of Mg:Al=1:2; magnesium and gallium in a molar ratio of Mg:Ga=1:2; magnesium and indium in a molar ratio of Mg:In=1:2; calcium and indium in a molar ratio of Ca:In=1:2; barium and indium in a molar ratio of Ba:In=1:2; strontium and indium in a molar ratio of Sr:In=1:2; magnesium and tin in a molar ratio of Mg:Sn=2:1; magnesium, aluminum, and gallium in a molar ratio of Mg:Al:Ga=1:1:1; and magnesium, aluminum, and gallium in a molar ratio of Mg:Al:Ga=1:1.2:0.8.

13. An electrode material for a non-aqueous electrolytic secondary battery of claim 1 wherein said second spinel crystal structure shares oxygen with said first spinel crystal structure.

* * * * *